H. B. SINCLEAR.
Plow.
No. 6,020.
Patented Jan. 9, 1849.
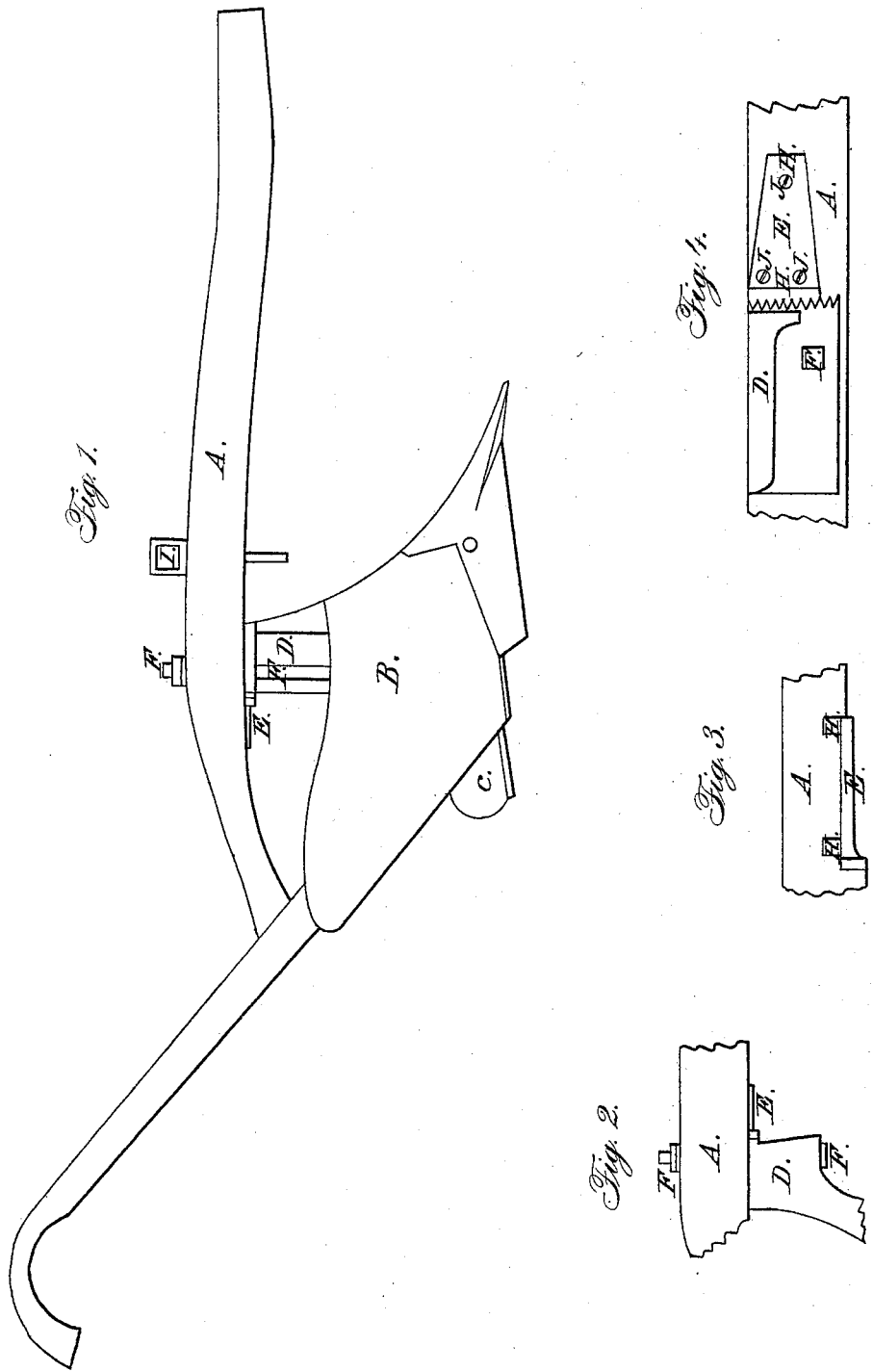

UNITED STATES PATENT OFFICE.

H. B. SINCLEAR, OF LYNDONVILLE, NEW YORK.

IMPROVEMENT IN PLOWS.

Specification forming part of Letters Patent No. 6,020, dated January 9, 1849.

*To all whom it may concern:*

Be it known that I, HEMAN B. SINCLEAR, of Lyndonville, in the county of Orleans and State of New York, have invented a new and useful Improvement in Plows and Cultivators; and I do hereby declare that the following is a full, clear, and exact description of the construction and operation of the same, reference being had to the annexed drawings, making a part of this specification, in which—

Figure 1 is a side view of an ordinary plow; A, its beam; B, mold-board; C, landside; D, standard; E, regulating-set; F, standard-bolt, with its head, washer, and nut; I, wrench for nut of the standard-bolt.

Fig. 2 shows part of the landside of a plow; A, beam; D, standard; E, regulating-set; F F, head and nut of the standard-bolt.

Fig. 3 is a side view of the regulating-set; A, section of beam; E, regulating-set; H H, two round projections about three-fourths of an inch in diameter, let into beam, so, by their means and three screws or small bolts, to hold it tight to its place.

Fig. 4 is an under-side view of the regulating-set; A, beam; D, section of standard; E, regulating-set, with its teeth and method of securing; F, head of standard-bolt; H H, position of projections into beam, as shown by H H, Fig. 3; J J J, screws or small bolts to secure the regulating-set.

The drawings in Figs. 3 and 4 are on a scale of about one-fourth the actual size.

By inspecting the drawings it is apparent that by unscrewing the nut of the standard-bolt the part of the regulating-set marked E and its corresponding part added to the standard become readily movable by changing the teeth to require more or less draft or horses. The teeth being on a slight curve equal to the distance of the teeth from the pin of the plow-beam into the handle of the plow, a change of about two of these teeth will generally be found about equal to the power (plus or minus) of one horse on ordinary plowing.

This improvement can be applied to any plow now in use, and by it the draft of the plow can be instantly adapted to one, two, three, or more horses, so that it supersedes the necessity for a clevis altogether, and renders the plow much more steady and manageable.

I do not claim the invention of any particular plow, but simply this method of regulating the draft by the above-described standard D, bolt F F, and regulating-set E. It can also be applied to all agricultural tools where a clevis is required of any kind.

HEMAN B. SINCLEAR.

Witnesses:
JOSEPH NIXSON,
MARVIN S. PERKINS.